(12) United States Patent
Anderson et al.

(10) Patent No.: US 8,448,665 B1
(45) Date of Patent: May 28, 2013

(54) FUEL OVERFLOW ALARM SYSTEM (76) Inventors: Perry R Anderson, Las Vegas, NV (US); Darla C. Anderson, Las Vegas, NV (US)

( * ) Notice: Subject to any disclaimer, the term of this patent is extended or adjusted under 35 U.S.C. 154(b) by 233 days.

(21) Appl. No.: 12/701,839

(22) Filed: Feb. 8, 2010

Related U.S. Application Data (63) Continuation-in-part of application No. 12/510,784, filed on Jul. 28, 2009.

(60) Provisional application No. 61/137,271, filed on Jul. 29, 2008, provisional application No. 61/207,037, filed on Feb. 5, 2009.

(51) Int. Cl.
*F17D 3/01* (2006.01)
*F17D 3/18* (2006.01)
*F16K 24/00* (2006.01)
*G01F 23/16* (2006.01)
*G01F 23/18* (2006.01)

(52) U.S. Cl.
USPC ............. 137/558; 137/557; 137/587; 73/37; 73/290 B; 73/290 R; 73/49.7

(58) Field of Classification Search
USPC ............ 137/557, 558, 587, 588; 73/37, 49.7, 73/290 B, 290 R; 116/109, 227
See application file for complete search history.

(56) References Cited

U.S. PATENT DOCUMENTS

| | | | | |
|---|---|---|---|---|
| 4,354,383 A * | 10/1982 | Hartel | .................... | 73/290 B |
| 4,450,721 A * | 5/1984 | Gaunt et al. | ............... | 73/290 B |
| 4,535,627 A * | 8/1985 | Prost et al. | ................ | 73/290 B |
| 4,553,431 A * | 11/1985 | Nicolai | ................... | 73/290 B |
| 4,687,021 A * | 8/1987 | Ise et al. | ................... | 137/526 |
| 4,697,618 A * | 10/1987 | Youtt et al. | ................ | 137/587 |
| 4,821,697 A * | 4/1989 | McDougal | ............. | 123/406.21 |
| 4,862,856 A * | 9/1989 | Yokoe et al. | ............... | 123/519 |
| 4,933,852 A * | 6/1990 | Lemelson | ................ | 701/30 |
| 5,279,341 A * | 1/1994 | Schirmacher | ............. | 141/387 |
| 5,282,497 A * | 2/1994 | Allison | ...................... | 141/59 |
| 5,425,266 A * | 6/1995 | Fournier | ................... | 73/49.7 |
| 5,507,176 A * | 4/1996 | Kammeraad et al. | ......... | 73/49.2 |
| 5,671,718 A * | 9/1997 | Curran et al. | ............... | 123/520 |
| 5,675,073 A * | 10/1997 | Otsuka | .................... | 73/40.5 R |
| 5,842,763 A * | 12/1998 | Lakosky | .................. | 362/23 |
| 6,016,827 A * | 1/2000 | Dawson | ................... | 137/202 |
| 6,036,928 A * | 3/2000 | Barnstead | ................ | 422/295 |
| 6,067,967 A * | 5/2000 | Kidokoro et al. | ............ | 123/516 |
| 6,073,487 A * | 6/2000 | Dawson | ................... | 73/114.39 |
| 6,164,123 A * | 12/2000 | Corkill | .................... | 73/49.7 |
| 6,546,955 B1 * | 4/2003 | Burke | ...................... | 137/557 |
| 6,986,341 B2 * | 1/2006 | Mitani et al. | ............... | 123/520 |
| 7,129,832 B2 * | 10/2006 | Sabatino | ................... | 340/511 |
| 7,135,981 B1 * | 11/2006 | Lafontaine | ................ | 340/618 |
| 7,481,237 B2 * | 1/2009 | Jones et al. | ................ | 137/12 |
| 2001/0027680 A1 * | 10/2001 | Fabre | ...................... | 73/49.7 |

* cited by examiner

*Primary Examiner* — Craig Schneider
*Assistant Examiner* — Jonathan Waddy
(74) *Attorney, Agent, or Firm* — Jerry Haynes Law (57) ABSTRACT

An illustrative embodiment of a fuel overflow alarm system includes a fuel tank, a pressure-sensing tube provided in fluid communication with the fuel tank, a pressure sensor provided in fluid communication with the pressure-sensing tube, a microcontroller interfacing with the pressure sensor and a fuel gauge connected to the microcontroller.

13 Claims, 7 Drawing Sheets

FUEL OVERFLOW ALARM SYSTEM

CROSS-REFERENCE TO RELATED APPLICATIONS

This application is a continuation-in-part of and incorporates by reference in its entirety U.S. application Ser. No. 12/510,784, filed Jul. 28, 2009 and entitled "Fuel Overflow Alarm System", which claims the benefit of and incorporates by reference in its entirety U.S. provisional patent application No. 61/137,271, filed Jul. 29, 2008 and entitled "Fuel Overflow Alarm System" and U.S. provisional patent application No. 61/207,037, filed Feb. 5, 2009 and entitled "Fuel Overflow Alarm System".

FIELD OF THE INVENTION

The present disclosure relates to systems which prevent overfilling of a vehicle fuel tank with fuel. More particularly, the present disclosure relates to a fuel overflow alarm system which is particularly suitable for preventing discharge of fuel into a water body on which a marine vehicle is docked as a result of over-fueling of the marine vehicle.

BACKGROUND OF THE INVENTION

Motorized marine vehicles such as boats generally utilize an internal fuel tank. The fuel tank of the marine vehicle typically communicates with a neck or fuel conduit having an opening which opens to the exterior of the marine vehicle and through which a fuel nozzle is inserted to fill the fuel tank with fuel. A vent stack or overflow conduit may extend from the fuel tank and discharge to the side of the marine vehicle to vent fumes from the fuel tank. In the event that the fuel tank is overfilled with fuel, a visual indication of such overfilling may result from flow of fuel initially from the fuel tank through the overflow conduit and ultimately, discharge of the fuel from the overflow conduit onto the water body. However, overfilling of the fuel tank and discharge of the fuel into the water body may contribute to pollution of the water body. Furthermore, the discharged fuel may become a potential fire hazard since the fuel will float on the water and remain combustible. Additionally, air may become blocked in the overflow conduit and fuel may spill from the conduit even though the fuel tank is not full. Thus, knowledge of when to stop the flow of fuel into the fuel tank on the part of the person filling the tank to prevent tank overfilling is desirable.

Therefore, a need exists for a fuel overflow alarm system which indicates that overfilling of a fuel tank in a marine vehicle is imminent during refueling of the marine vehicle to prevent fuel from being discharged into a water body on which the marine vehicle is docked.

SUMMARY OF THE INVENTION

The present disclosure is generally directed to a fuel overflow alarm system. An illustrative embodiment of the fuel overflow alarm system includes a fuel tank, a pressure-sensing tube provided in fluid communication with the fuel tank, a pressure sensor provided in fluid communication with the pressure-sensing tube, a microcontroller interfacing with the pressure sensor and a fuel gauge connected to the microcontroller.

In some embodiments, the fuel overflow alarm system may include a fuel tank; a pressure-sensing tube provided in fluid communication with the fuel tank; a system controller comprising a controller housing, a pressure sensor provided in the controller housing and disposed in fluid communication with the pressure-sensing tube and a microcontroller provided in the controller housing and interfacing with the pressure sensor; and a fuel gauge interfacing with the microcontroller.

In some embodiments, the fuel overflow alarm system may include a fuel tank; a pressure-sensing tube provided in fluid communication with the fuel tank; a pressure sensor provided in fluid communication with the pressure-sensing tube; a system controller having a microcontroller interfacing with the pressure sensor; a fuel gauge interfacing with the microcontroller; a vent conduit provided in fluid communication with the fuel tank; a vapor canister provided in the vent conduit; at least one valve provided in the vent conduit in fluid communication with the vapor canister and interfacing with the microprocessor; a canister sensor interfacing with the vapor canister and the microprocessor; and at least one alarm interfacing with the microprocessor.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to implement the disclosure and are not intended to limit the scope of the claims. Furthermore, there is no intention to be bound by any expressed or implied theory presented in the preceding technical field, background, brief summary or the following detailed description.

Figure 1:
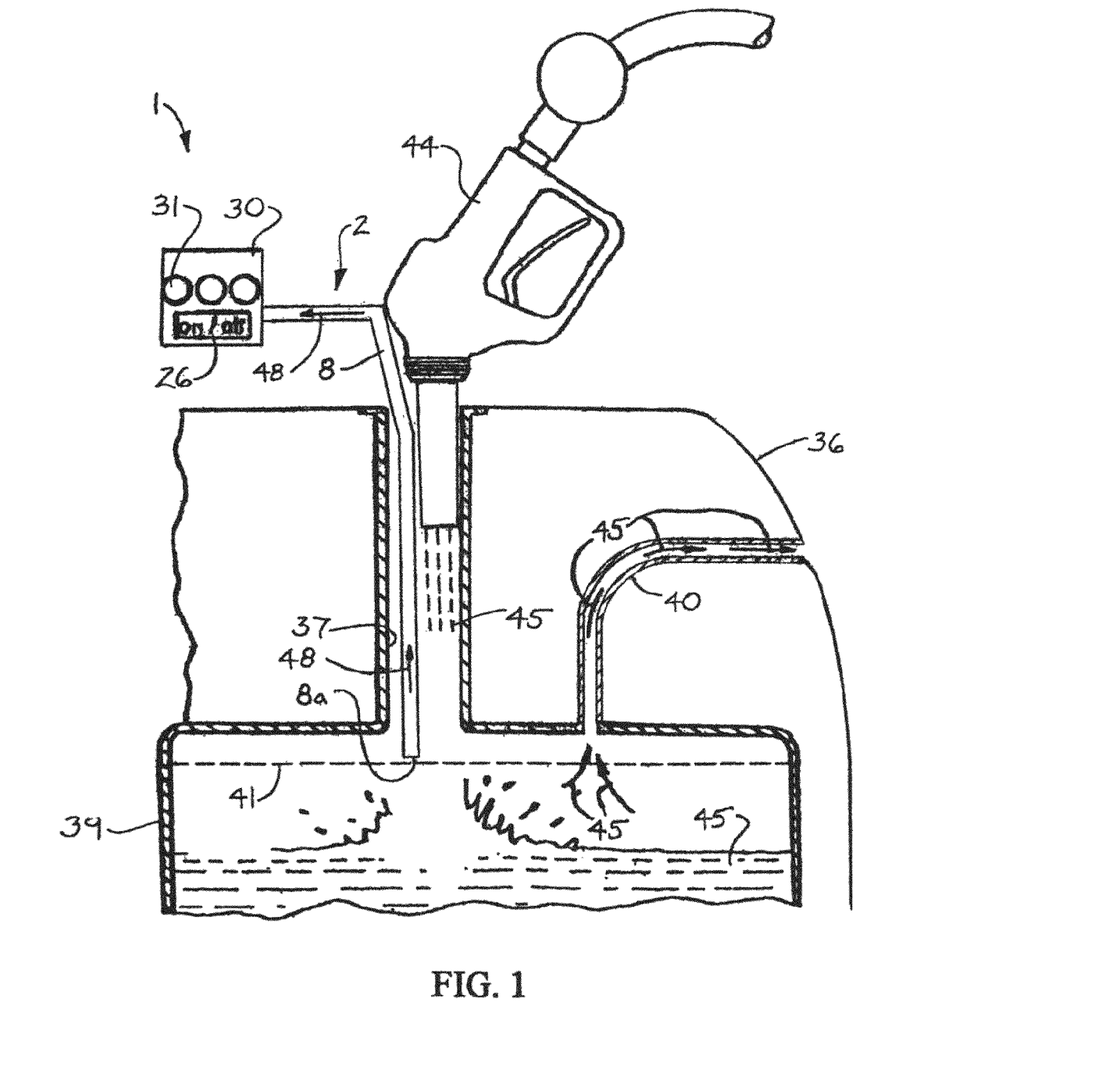
FIG. 1 is a partially schematic side view of an illustrative embodiment of the fuel overflow alarm system in an exemplary implementation of the system.
Figure 2:
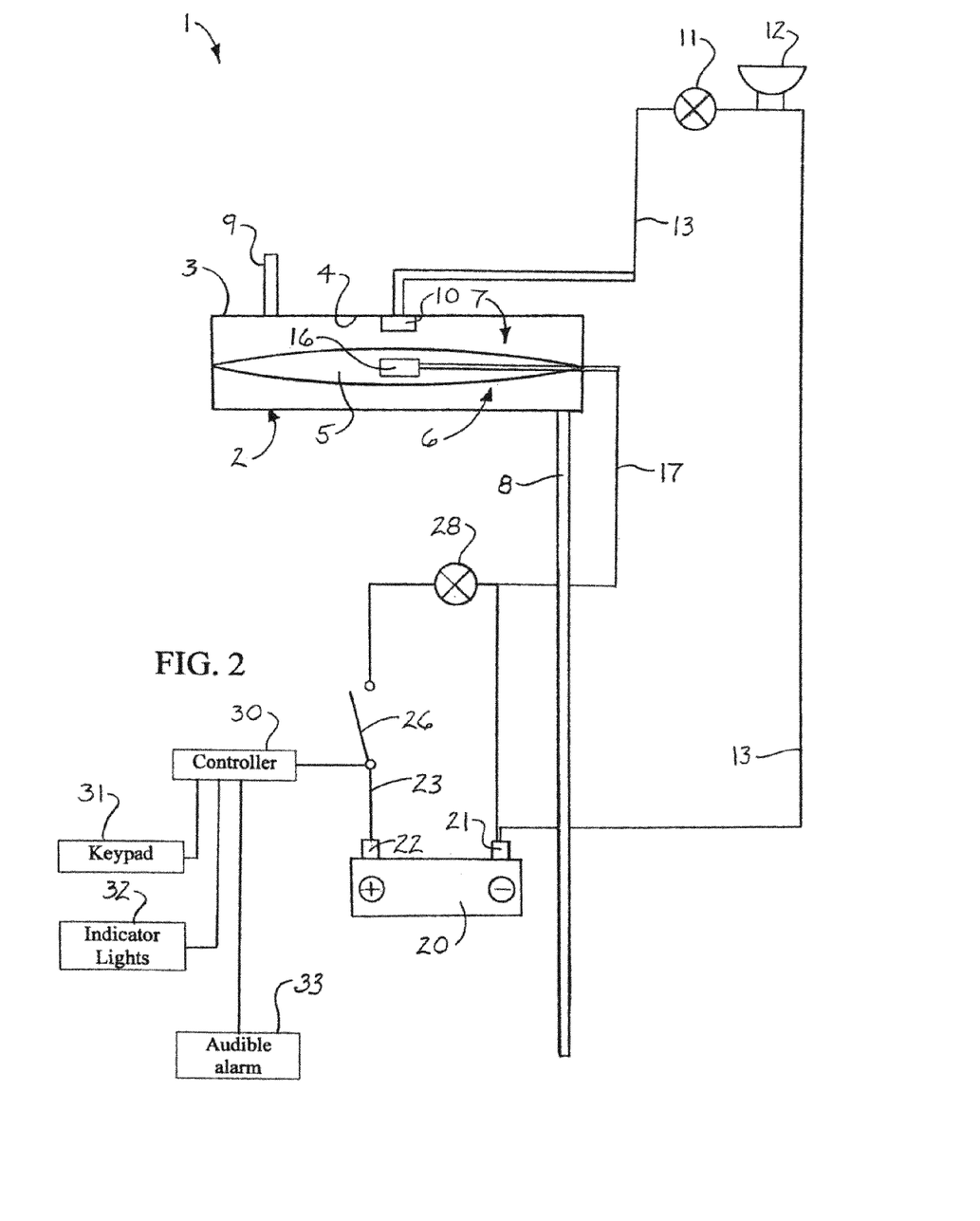
FIG. 2 is a schematic diagram of an illustrative embodiment of the fuel overflow alarm system.
Figure 3:
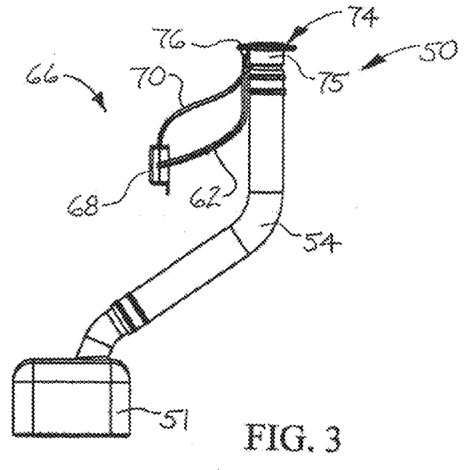
FIG. 3 is a side view of an alternative illustrative embodiment of the fuel overflow alarm system.
Figure 4:
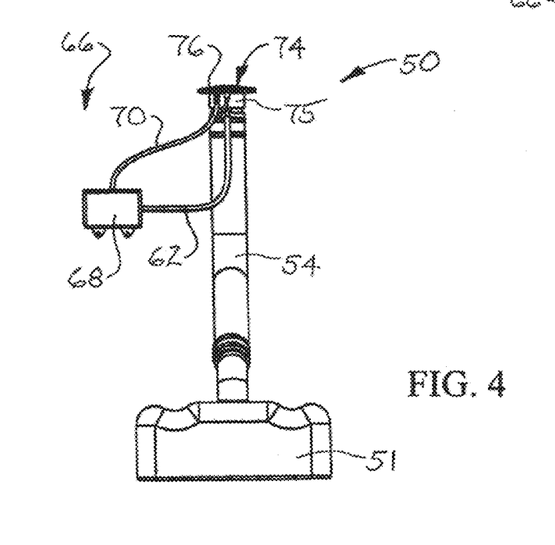
FIG. 4 is a front view of the fuel overflow alarm system illustrated in FIG. 3.
Figure 5:
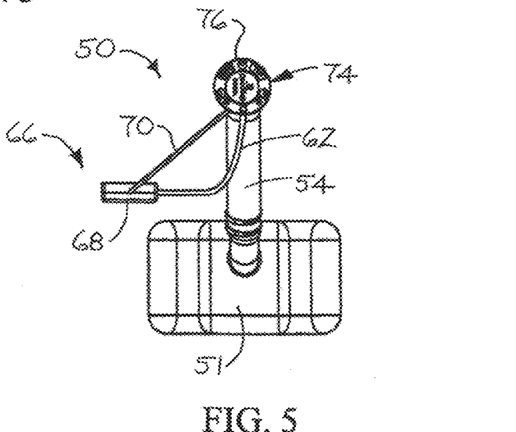
FIG. 5 is a top view of the fuel overflow alarm system illustrated in FIG. 3.

Referring initially to FIGS. 1 and 2 of the drawings, an illustrative embodiment of the fuel overflow alarm system, hereinafter system, is generally indicated by reference numeral 1. As illustrated in FIG. 1, the system 1 may include a pressure detection device 2 having a device housing 3 with a housing interior 4. A flexible diaphragm 5, which may be rubber or other resilient or elastomeric material, may be provided in the housing interior 4 of the device housing 3. The diaphragm 5 may divide the housing interior 4 of the device housing 3 into a high pressure area 6 and a low pressure area 7. A pressure conduit 8, the purpose of which will be hereinafter described, may be disposed in fluid communication with the high pressure area 6 of the housing interior 4 and extends from the device housing 3. A vent conduit 9 may be disposed in fluid communication with the low pressure area 7 of the device housing 3 and extends from the device housing 3 for venting purposes.

A stationary contact 10 may be provided on the device housing 3 in the low pressure area 7 of the housing interior 4. An alarm electrical conduit 13 such as wiring, for example and without limitation, may be disposed in electrical communication with the stationary contact 10. A negative terminal 21 of a battery 20 may be disposed in electrical communication with the alarm electrical conduit 13. An alarm lamp 11, which may be red in color, for example and without limitation, may be provided in the alarm electrical conduit 13. An audible alarm 12 may be additionally or alternatively provided in the alarm electrical conduit 13. Switch wiring 23 may be disposed in electrical communication with a positive terminal 22 of the battery 20.

A diaphragm contact 16 may be provided on the diaphragm 5 of the pressure detection device 2. A diaphragm electrical conduit 17 may be disposed in electrical communication with the diaphragm contact 16. A power lamp 28, which may be green, for example and without limitation, may be provided in the diaphragm electrical conduit 17. A power switch 26 may be disposed in electrical communication with the switch wiring 23. Upon manual closing of the switch 26 and contact of the diaphragm contact 16 on the diaphragm 5 with the stationary contact 10 on the device housing 3, a circuit is closed or completed between the negative terminal 21 and the positive terminal 22 of the battery 20 through the switch wiring 23, the power switch 26, the diaphragm electrical contact 17, the diaphragm contact 16, the stationary contact 10 and the alarm electrical conduit 13, respectively. Closing of the circuit may energize the alarm lamp 11 and/or the audible alarm 12 and the power lamp 28.

In some embodiments, a controller 30 may be connected to the power switch 26. A keypad 31, indicator lights 32 and/or an audible alarm 23 may be disposed in electrical communication with the controller 30. In some embodiments, the controller 30 may be connected to a control mechanism for the fuel dispensing nozzle 44 to facilitate automatic shutoff of the fuel dispensing nozzle 44 for purposes which will be hereinafter described.

As illustrated in FIG. 1, in typical application, the system 1 prevents overflow of fuel 45 from a fuel tank 39 through a fuel overflow conduit 40 provided in a marine vehicle 36. A fuel conduit 37 may extend into the surface of the marine vehicle 36 and communicate with the fuel tank 39. The fuel conduit 37 is adapted to receive a hand-operated fuel dispensing nozzle 44 from which the fuel 45 is dispensed into the fuel tank 39 through the fuel conduit 37.

The power switch 26 of the pressure detection device 2 is manipulated to the closed position to turn on the system 1. Prior to dispensing the fuel 45 from the fuel dispensing nozzle 44 into the fuel tank 39, the pressure conduit 8 of the system 1 is inserted into the fuel conduit 37 of the marine vehicle 36 until an inlet end 8a of the pressure conduit 8 is disposed just below a maximum fuel fill level inside the fuel tank 39. The fuel dispensing nozzle 44 is then inserted into the fuel conduit 37, after which fuel 45 is dispensed from the fuel dispensing nozzle 44 through the fuel conduit 37 and into the fuel tank 39. As the level of fuel 45 in the fuel tank 39 rises and eventually reaches the maximum fuel fill level 41, air pressure 48 develops in the pressure conduit 8 of the pressure detection device 2 and enters the high pressure area 6 (FIG. 2) in the housing interior 4 of the device housing 3 of the pressure detection device 2. The air pressure 48 is applied against the diaphragm 5 and, due to escape of air from the low pressure area 7 of the housing interior 4 through the vent conduit 9, the pressure of air in the high pressure area 6 exceeds the pressure of air in the low pressure area 7 of the housing interior 4 of the device housing 3. Consequently, the diaphragm 5 flexes toward the low pressure area 7 in the housing interior 4.

As the diaphragm 5 continues to flex away from the high pressure area 6 toward the low pressure area 7 in the housing interior 4 of the device housing 3, the diaphragm contact 16 on the flexing diaphragm 5 eventually contacts the stationary contact 10 on the interior surface of the device housing 3, thereby closing the circuit between the negative terminal 21 and the positive terminal 22 of the battery 20 and energizing the alarm lamp 11 and/or the audible alarm 12 in the alarm electrical conduit 13. The energized alarm lamp 11 and/or audible alarm 12 notifies the operator of the fuel dispensing nozzle 44 that overflow of the fuel 45 from the fuel tank 39 through the fuel overflow conduit 40 is imminent, enabling the operator to terminate further dispensing of fuel 45 from the fuel dispensing nozzle 44 and prevent overflow of fuel 45 from the fuel tank 39. During operation of the system 1, the power lamp 28 in the diaphragm electrical conduit 17 may be energized to indicate that the system 1 is functioning properly. After use, the power switch 26 may be manipulated to the open position to turn off the system 1.

In some embodiments, programmed operation of the pressure detection device 2 via the controller 30 according to the preferences of the operator may be made by manipulation of the keypad 31. The indicator lights 32 and/or audible alarm 33 which are connected to the controller 30 may additionally indicate imminent overfilling of the fuel tank 39 and may be provided at a location which is separate from the location or locations of the alarm lamp 11 and/or audible alarm 12. In some embodiments, the controller 30 may be electrically connected to the fuel dispensing nozzle 44 to automatically terminate dispensing of fuel 45 from the fuel dispensing nozzle 44 upon closing of the switch 26.

Figures 6, 7:
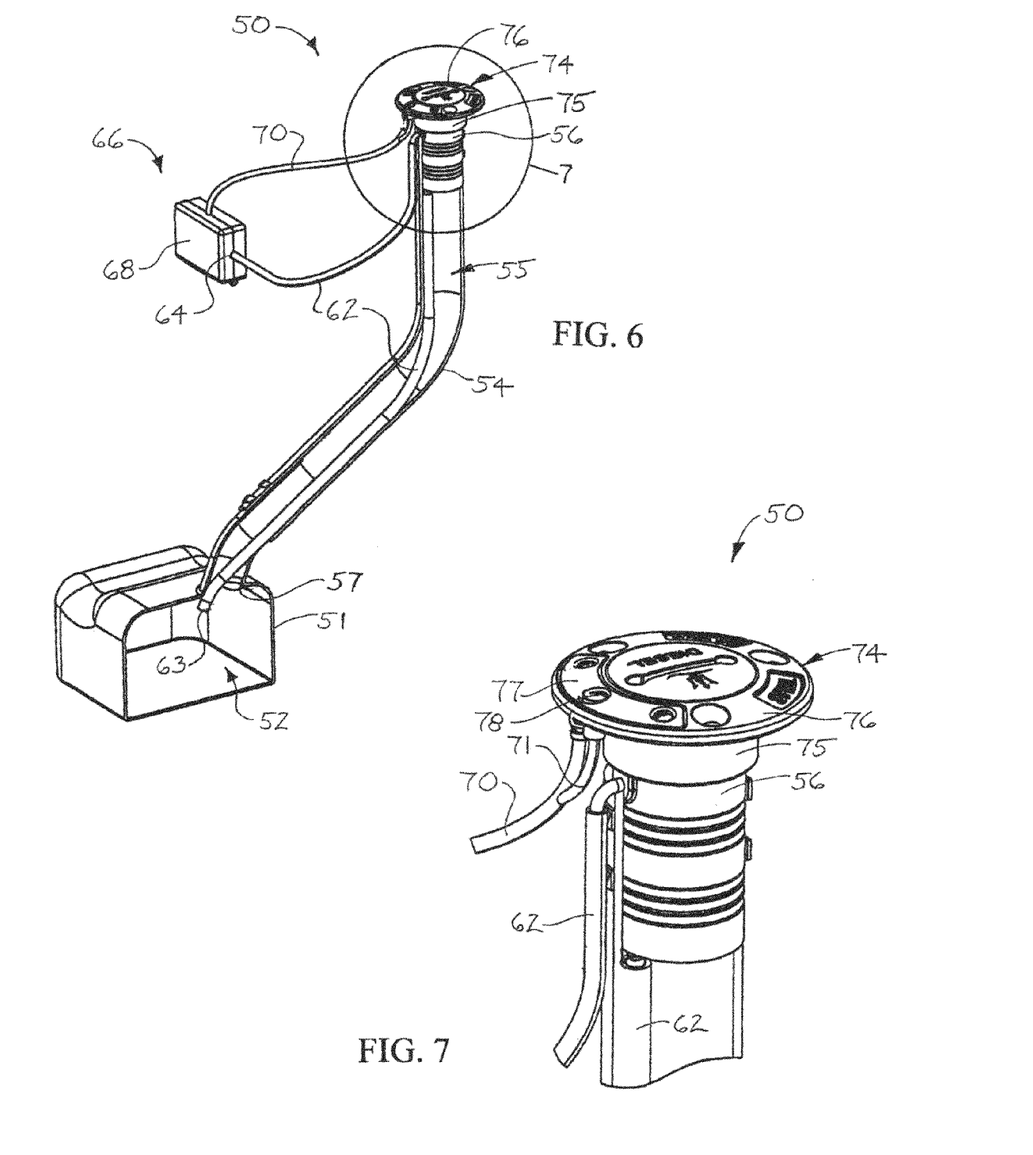
FIG. 6 is a sectional view of the fuel overflow alarm system illustrated in FIG. 3.
FIG. 7 is an enlarged sectional view taken along section line 7 in FIG. 6.

Referring next to FIGS. 3-7 of the drawings, an alternative illustrative embodiment of the fuel overflow alarm system, hereinafter system, is generally indicated by reference numeral 50. The system 50 may include a fuel tank 51 which is adapted for installation in a fuel tank (not illustrated) of a marine vehicle. As illustrated in FIG. 6, the fuel tank 51 has a fuel tank interior 52. A generally elongated fuel conduit 54 having a fuel conduit interior 55 includes a fuel fill end 56 and a fuel discharge end 57 which is opposite the fuel fill end 56 and is disposed in fluid communication with the fuel tank interior 52 of the fuel tank 51.

A cap 74 may be provided on the fuel fill end 56 of the fuel conduit 54. The cap 74 may include a cap neck 75 which receives the fuel conduit 54 and a cap flange 76 which extends outwardly from the cap neck 75. As illustrated in FIG. 7, in some embodiments a full indicator lens 77 and a power lamp 78 may be provided on the cap flange 76 of the cap 74 for purposes which will be hereinafter described. The full indicator lens 77 may be red in color and the power lamp 78 may be green in color, for example and without limitation.

A pressure detection device 66 may include a pressure conduit 62 which extends through the fuel conduit interior 55 of the fuel conduit 54 and includes a pressure inlet end 63 which is disposed in fluid communication with the fuel tank interior 52 of the fuel tank 51. The pressure conduit 62 may extend from the fuel fill end 56 of the fuel conduit 54 and terminate in a pressure discharge end 64 which is opposite the pressure inlet end 63. Controller 68 may be disposed in fluid communication with the pressure discharge end 64 of the pressure conduit 62. A wiring harness 70 may electrically connect the controller 68 to the full indicator lens 77 and the power lamp 78 provided on the cap 74. A pressure relief conduit 71 may be disposed in fluid communication with the fuel conduit interior 55 of the fuel conduit 54 to vent vapor pressure from the fuel conduit interior 55.

In operation of the system 50, which will be hereinafter further described, air pressure develops in the pressure conduit 62 of the pressure detection device 66 as fuel (not illustrated) is introduced into the fuel tank interior 52 of the fuel tank 51 through the fuel conduit 54. The rising air pressure which develops in the pressure detection conduit 62 may gradually reach a threshold pressure level when the rising level of the fuel reaches a corresponding maximum fuel fill level in the tank interior 52. In some applications, the maximum fuel fill level in the tank interior 52 of the fuel tank 51 may correspond to the pressure inlet end 63 of the pressure conduit 62. The controller 68 may be adapted to sense the rising air pressure as it develops in the pressure conduit 62 and, when the threshold pressure level of the air pressure in the pressure detection conduit 62 is reached, may be adapted to illuminate the full indicator lens 77 (FIG. 7) provided on the cap flange 76 of the cap 74. The controller 68 may additionally be adapted to illuminate the power lamp 78 provided on the cap flange 76 of the cap 74.

In typical application, the system 50 prevents overflow of fuel (not illustrated) from the fuel tank interior 52 of the fuel tank 51 through the fuel conduit 54 or alternatively, through a fuel overflow conduit (not illustrated) which may connect the fuel tank interior 52 of the fuel tank 51 to the exterior of a marine vehicle (not illustrated) in which the fuel tank 51 is installed, as was heretofore described with respect to FIG. 1. Accordingly, the cap 74 is initially detached from the fuel fill end 56 of the fuel conduit 54, after which a typically hand-actuated fuel dispensing nozzle 44 (FIG. 1) is inserted into the fuel conduit interior 55 of the fuel conduit 54. Fuel (not illustrated) is then dispensed from the fuel dispensing nozzle and into the fuel tank interior 52 of the fuel tank 51 through the fuel conduit interior 55 of the fuel conduit 54.

As the fuel enters the fuel tank interior 55 of the fuel tank 51 from the fuel conduit interior 55 of the fuel conduit 54, air pressure develops in the pressure conduit 62 of the pressure detection device 66. When the level of rising fuel in the fuel tank interior 52 reaches a maximum fuel fill level in the fuel tank 51, the air pressure which develops in the pressure conduit 62 corresponds to the threshold pressure level at which point the controller 68 illuminates the full indicator lens 77 (FIG. 7) provided on the cap 74. Accordingly, the illuminated full indicator lens 77 indicates to the operator of the fuel dispensing nozzle that the level of fuel has reached the maximum fuel fill level in the fuel tank interior 52 of the fuel tank 51. Thus, the operator can terminate further operation of the fuel dispensing nozzle to prevent overflow of the fuel from the fuel tank 51. In some embodiments, at least one audible alarm (not illustrated) may be connected to the controller 30 for sounding of the audible alarm or alarms when the fuel has reached the maximum fuel level in the fuel tank 51.

Figure 8:
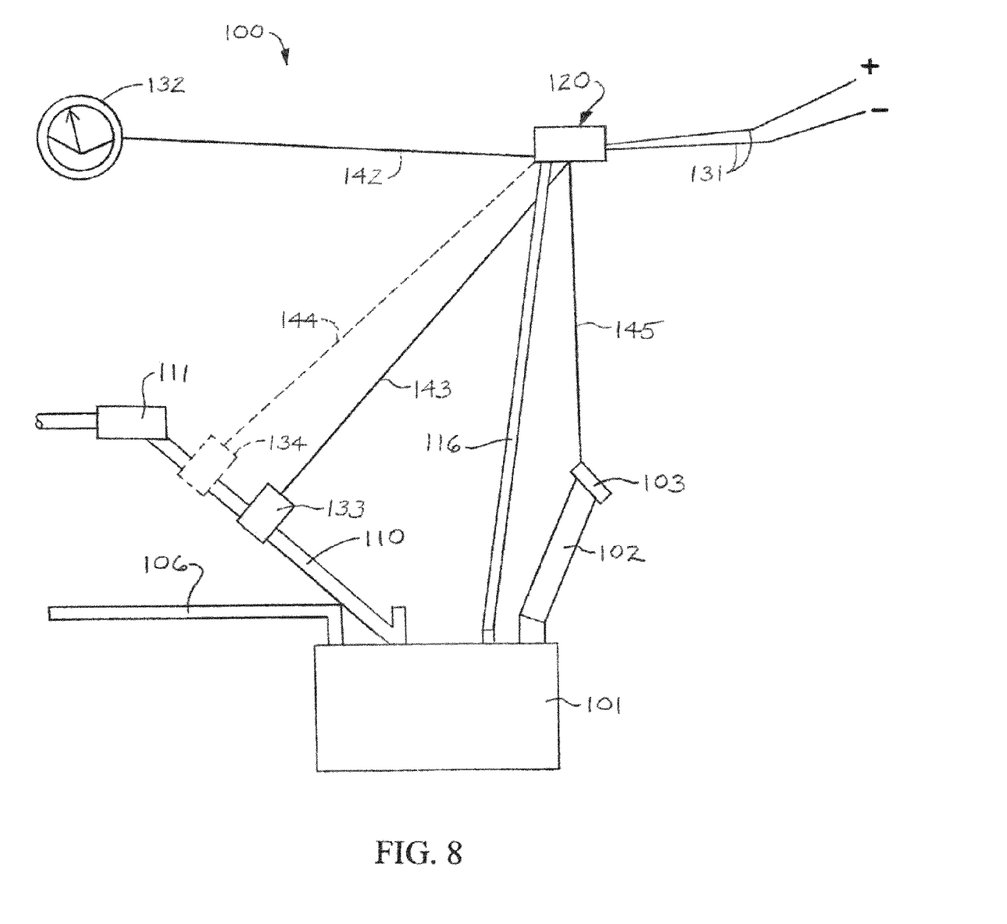
FIG. 8 is a schematic diagram of another alternative illustrative embodiment of the fuel overflow alarm system.
Figure 9:
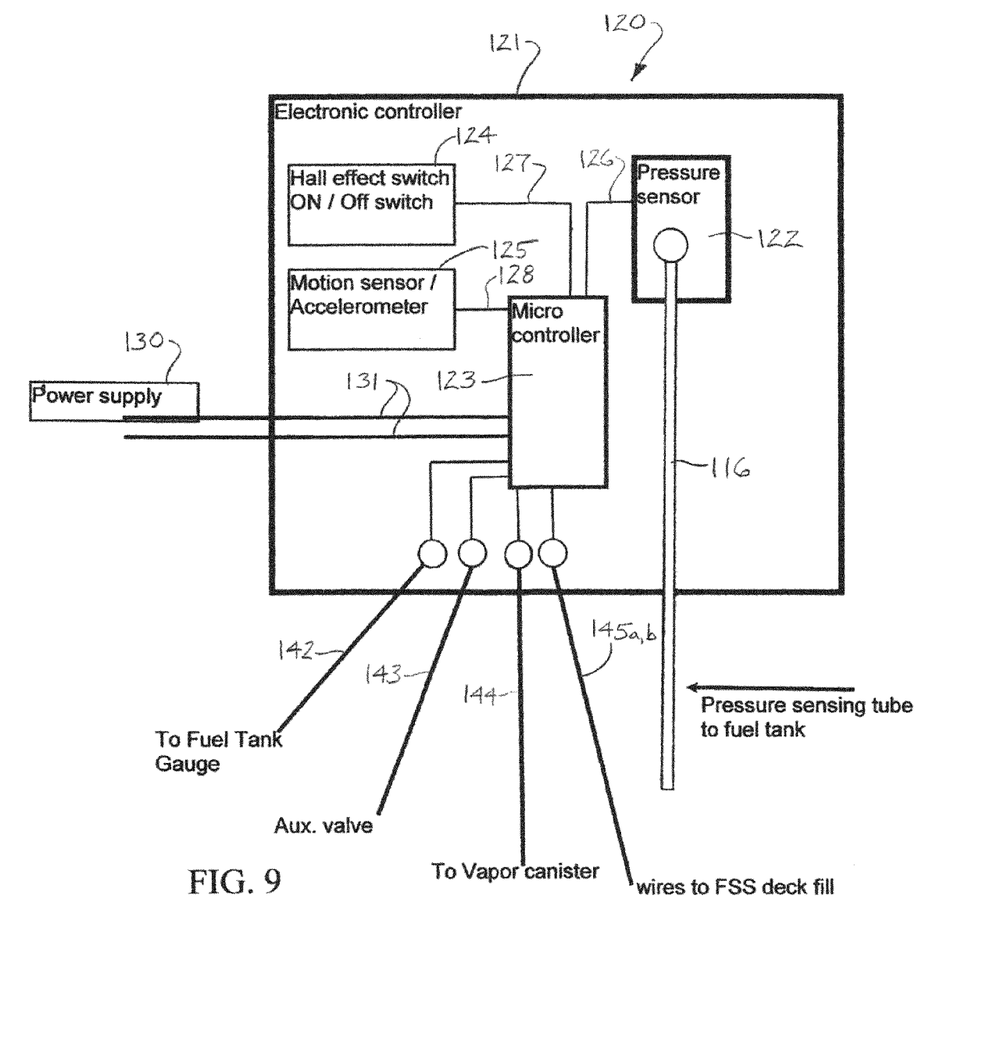
FIG. 9 is a schematic block diagram of a system controller of the illustrative embodiment of the fuel overflow alarm system illustrated in FIG. 8.
Figure 10:
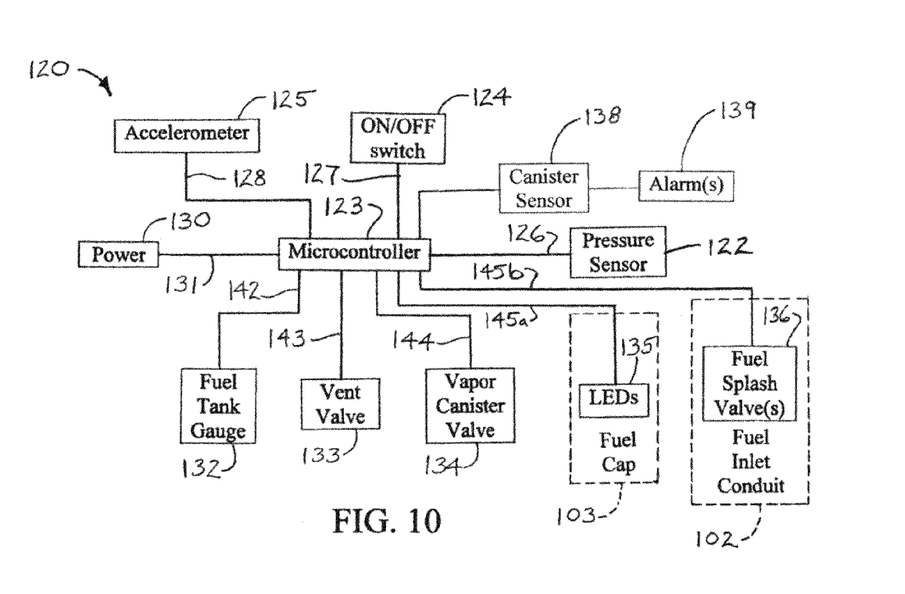
FIG. 10 is a functional block diagram of the system controller of the illustrative embodiment of the fuel overflow alarm system illustrated in FIG. 8.

Referring next to FIGS. 8-10 of the drawings, another alternative illustrative embodiment of the fuel overflow alarm system is generally indicated by reference numeral 100. As illustrated in FIG. 8, the system 100 includes a fuel tank 101 which may be an on-board fuel tank for a marine vehicle or other type of vehicle and is adapted to contain fuel (not illustrated) for operation of the vehicle. A fuel inlet conduit 102 may extend from the fuel tank 101 for the purpose of dispensing fuel (not illustrated) from a fuel dispensing nozzle (not illustrated) into the fuel tank 101 through the fuel inlet conduit 102, such as in the conventional manner. The fuel inlet conduit 102 may be sized and configured to accept any type of fuel dispensing nozzle which is known to those skilled in the art. A fuel cap 103 may be threaded, friction-fitted or otherwise detachably attached to the fuel inlet conduit 102. A fuel delivery conduit 106 may extend from the fuel tank 101 and connect to an engine (not illustrated) of the vehicle for the purpose of distributing fuel from the fuel tank 101 to the engine. A vent conduit 110 may be disposed in fluid communication with the fuel tank 101 to dissipate excessive fuel vapor pressure in the fuel tank 101. A vapor canister 111 may be provided in the vent conduit 110 to receive and store fuel vapor from the fuel tank 101, as is known by those skilled in the art.

As further illustrated in FIG. 8, a pressure-sensing tube 116 may be disposed in fluid communication with the fuel tank 101. In some embodiments, the pressure-sensing tube 116 may communicate with the fuel tank 101 through an orifice (not illustrated) which is separate from the fuel inlet conduit 102, as illustrated. In other embodiments, the pressure-sensing tube 116 may communicate with the fuel tank 101 through the fuel inlet conduit 102 or through any other suitable fitting, orifice or conduit which communicates with the fuel tank 101. The pressure-sensing tube 116 may be adapted to receive fuel vapor (not illustrated) from the fuel tank 101.

As illustrated in FIG. 9, a system controller 120 may be disposed in fluid communication with the pressure-sensing tube 116. The system controller 120 may include a controller housing 121 which contains the various functional components of the system controller 120. The system controller 120 may include a microcontroller 123. A pressure sensor 122 which is disposed in fluid communication with the pressure-sensing tube 116 may interface with the microcontroller 123 such as through sensor wiring 126, for example and without limitation, and/or through other suitable electrical contact. A power switch 124, which may be a Hall effect switch, may be connected to the microcontroller 123 such as through switch wiring 127 and/or other suitable electrical contact. In some embodiments, at least one accelerometer 125 may interface with the microcontroller 123 such as through accelerometer wiring 128 and/or other suitable electrical contact. A power supply 130, which may include at least one battery, for example and without limitation, may interface with the microcontroller 123 such as through power supply wiring 131 and/or other suitable electrical contact.

As illustrated in FIGS. 8-10, a fuel gauge 132 may be connected to the microcontroller 123 of the system controller 120 such as through gauge wiring 142 and/or other suitable electrical contact. The fuel gauge 132 may be an analog gauge, a digital gauge or an LCD gauge, for example and without limitation. A vent valve 133 which is provided in the vent conduit 110 may be connected to the microcontroller 123 such as through vent valve wiring 143 and/or other suitable electrical contact. In some embodiments, a vapor canister valve 134 (illustrated in phantom in FIG. 8) may be provided in the vent conduit 110. The vapor canister valve 134 may be connected to the microcontroller 123 through vapor canister valve wiring 144 and/or other suitable electrical contact. In some embodiments, the vapor canister valve 134 may be omitted from the vent conduit 110 and the vent valve 133 may carry out the functions of the canister valve 134. An on-board diagnostics system (not illustrated) may be provided to monitor functioning of the vent valve 133 and/or the canister valve 134, according to the knowledge of those skilled in the art, and indicate whether the vent valve 133 and/or the canister valve 134 requires repair and/or replacement.

As illustrated in FIG. 10, an on-board diagnostics system for the vapor canister 111 may include a canister sensor 138 which interfaces with the microcontroller 123. The canister sensor 138 may be adapted to sense the fuel vapor pressure inside the vapor canister 111 according to the knowledge of those skilled in the art. At least one alarm 139, which may be audible, visible or both audible and visible, may interface with the microcontroller 123. In the event that the fuel vapor pressure inside the vapor canister 111 exceeds a predetermined vapor pressure threshold, the microcontroller 123 may be adapted to activate the alarm or alarm is 139 to indicate a plugged or blocked state or condition of the vapor canister 111.

As further illustrated in FIG. 10, at least one LED 135 may be connected to the microcontroller 123 such as through LED wiring 145a and/or other suitable electrical contact. In some embodiments, the LED(s) 135 may be provided on the fuel cap 103, as illustrated in phantom in FIG. 10. In some embodiments, at least one fuel splash valve 136 may be connected to the microcontroller 123 such as through splash valve wiring 145b and/or other suitable electrical contact. The fuel splash valve(s) 136 may be provided in the fuel inlet conduit 102 (illustrated in phantom in FIG. 10) of the fuel tank 101, for example and without limitation.

The pressure sensor 122 may have the capability to measure the fuel vapor pressure (in millimeters or other unit of measure) of the fuel vapor in the pressure-sensing tube 116 and transmit this information to the microcontroller 123 via the sensor wiring 126. The microcontroller 123 may be adapted to interpret the measured fuel vapor pressure of the fuel vapor in the pressure-sensing tube 116 and correlate this measured fuel vapor pressure with the actual level of fuel in the fuel tank 101. The microcontroller 123 may further be adapted to transmit information which indicates the actual level of fuel in the fuel tank 101 to the fuel gauge 132 in the form of an analog signal, a voltage signal, a resistance signal, a digital signal or any other type of signal which is suitable for the purpose. The fuel gauge 132 visually indicates the level of fuel in the fuel tank 101 which is indicated by the transmitted signal. In some embodiments, the microcontroller 123 may be adapted to log the hours in use of the system 100 and indicate the hours in use on a display (not illustrated) or other manner.

In some embodiments, the accelerometer(s) 125 may be adapted to sense movement of the marine vessel on which the system controller 120 is mounted and transmit infatuation which indicates this movement of the marine vessel to the microcontroller 123. The microcontroller 123 may then be adapted to close the vent valve 133 (FIG. 8) in the vent conduit 110 to prevent fuel from inadvertently splashing from the fuel tank 101, through the vent conduit 110 and into the vapor canister 111 by excessive rocking and pitching of the marine vessel due to acceleration or wave movement, for example and without limitation.

The pressure sensor 122 may additionally be adapted to sense rising levels of fuel in the fuel tank 101 as the fuel is dispensed into the fuel tank 101 through the fuel inlet conduit 102 from a fuel dispensing nozzle (not illustrated). The pressure sensor 122 may be adapted to transmit information which indicates the rising fuel level to the microcontroller 123 through the sensor wiring 126. The microcontroller 123 may be adapted to energize the LEDs 135 (FIG. 10) in such a manner that the LEDs 135 blink or flash with increasing rapidity as the level of fuel in the fuel tank 101 rises. This may provide an early warning that the fuel tank 101 is in danger of overflowing with fuel as the fuel is dispensed into the fuel tank 101 through the fuel inlet conduit 102. In some embodiments, the microcontroller 123 may be adapted to open and close the vapor canister valve 134 (FIG. 8) in a cyclical manner via the vapor canister valve wiring 144 to extend the life of the vapor canister 111.

In some embodiments, the microcontroller 123 may be adapted to detect whether the vapor canister 111 is plugged or blocked by measuring the fuel vapor pressure in the vapor canister 111 and determining whether the measured fuel vapor pressure exceeds a predetermined threshold vapor pressure level. The microcontroller 123 may activate the alarm(s) 139 (FIG. 10) in the event that the measured fuel vapor pressure in the vapor canister 111 exceeds the threshold vapor pressure level, thus indicating that the vapor canister 111 is plugged or blocked.

In some applications of the system 100, fuel dispensing nozzles (not illustrated) which may be used to dispense fuel into the fuel tank 101 through the fuel inlet conduit 102 may be fitted with a conventional automatic fuel shutoff mechanism (not illustrated) in which fuel touches the end of the nozzle to interrupt a vacuum that is built into the nozzle such that the nozzle shuts off automatically. Accordingly, under circumstances in which the fuel vapor pressure in the pressure sensing tube 116 (as determined by the pressure sensor 122) indicates that the fuel tank 101 is full or almost full of fuel, the microcontroller 123 may be adapted to open and close the fuel splash valve(s) 136 to splash fuel (not illustrated) onto the end of the fuel dispensing nozzle (not illustrated) and interrupt the vacuum in the nozzle as the fuel is dispensed from the nozzle into the fuel inlet conduit 102. Therefore, interruption of the vacuum in the fuel dispensing nozzle may automatically terminate dispensing of fuel from the nozzle into the fuel tank 101 through the fuel inlet conduit 102, typically in the conventional manner, to prevent overflow of the fuel tank 101.

In some embodiments, the microcontroller 123 may be adapted to sense the vapor pressure of fuel in the pressure-sensing tube 116 via the pressure sensor 122, as was described herein above. The microcontroller 123 may prevent over-pressurization of the fuel tank 101 by opening the vent valve 133 provided in the vent conduit 110 (FIG. 8) and thereby facilitating escape of excess fuel vapor from the fuel tank 101 through the vent conduit 110. The microcontroller 123 may be programmed to adjust for atmospheric pressure which is applied against the exterior of the fuel tank 101.

In an exemplary application, the system 100 is mounted on a marine vehicle (not illustrated). Electrical power from the power supply 130 to the microcontroller 123 of the system controller 120 may be established by manipulation of the power switch 124. The fuel tank 101 is connected to the engine (not illustrated) of the marine vehicle through the fuel delivery conduit 106. Fuel (not illustrated) can be dispensed into the fuel tank 101 such as by removing the fuel cap 103 from the fuel inlet conduit 102, inserting a fuel dispensing nozzle (not illustrated) into the fuel inlet conduit 102 and dispensing the fuel from the fuel dispensing nozzle and into the fuel tank 101 through the fuel inlet conduit 102. As fuel enters the fuel tank 101, vapor pressure of the fuel rises in the pressure-sensing tube 116. Accordingly, the microcontroller 123 of the system controller 120 measures the rising fuel vapor pressure in the pressure-sensing tube 116 via the pressure sensor 122. The microcontroller 123 transmits information which indicates the level of fuel in the fuel tank 101 to the fuel gauge 132, which indicates the fuel level typically in the conventional manner. In the event that it senses excessive rocking, pitching, rapid acceleration or wave movement of the marine vehicle via the accelerometer(s) 125, the microcontroller 123 closes the vent valve 133 to prevent fuel from inadvertently splashing from the fuel tank 101 through the vent conduit 110 and into the vapor canister 111.

As the level of fuel in the fuel tank 101 rises, the microcontroller 123 blinks or flashes the LEDs 135 (FIG. 10) with increasing frequency to indicate the rising level of fuel in the fuel tank 101 and provide an early warning that an overflow condition of the fuel tank 101 is impending unless further dispensing of fuel into the fuel tank 101 is terminated. In the event that overflow of the fuel tank 101 is imminent, the microcontroller 123 may open the fuel splash valve(s) 136 (FIG. 10) and facilitate splashing of fuel into the end of the fuel dispensing nozzle, causing automatic termination of fuel flow from the nozzle into the fuel inlet conduit 102. The microcontroller 123 may prevent over-pressurization of the fuel tank 101 by opening the vent valve 133 provided in the vent conduit 110. In the event that the microcontroller 123 senses a fuel vapor pressure in the vapor canister 111 and determines that the measured fuel vapor pressure exceeds the predetermined vapor pressure threshold for the vapor canister 111, the microcontroller 123 may activate the alarm(s) 139 to alert an operator of the system 100 to a possibly plugged or blocked state or condition of the vapor canister 111. The microcontroller 123 may open and close the vapor canister valve 134 provided in the vent conduit 110 in a cyclical manner to extend the life of the vapor canister 111.

While illustrative embodiments of the disclosure have been described above, it will be recognized and understood that various modifications can be made and the appended claims are intended to cover all such modifications which may fall within the spirit and scope of the disclosure.

What is claimed is:

1. A fuel overflow alarm system, comprising:
   a fuel tank;
   a fuel inlet conduit provided in fluid communication with the fuel tank;
   at least one fuel splash valve provided in the fuel inlet conduit;
   a pressure-sensing tube provided in fluid communication with the fuel tank;
   a pressure sensor provided in fluid communication with the pressure-sensing tube;
   a microcontroller interfacing with the pressure sensor and the at least one fuel splash valve, the microcontroller adapted to automatically terminate dispensing of fuel into the fuel inlet conduit by closing the at least one fuel splash valve responsive to input from the pressure sensor;
   a fuel gauge connected to the microcontroller;
   a vent conduit provided in fluid communication with the fuel tank and at least one valve provided in the vent conduit and interfacing with the microcontroller; and
   at least one accelerometer interfacing with the microcontroller, the microcontroller adapted to close the at least one valve provided in the vent conduit responsive to sensing of movement by the at least one accelerometer.

2. The system of claim 1 further comprising a vapor canister provided in the vent conduit and wherein the at least one valve comprises a vent valve provided in fluid communication with the vapor canister.

3. The system of claim 2 wherein the at least one valve comprises a vapor canister valve provided in fluid communication with the vapor canister.

4. The system of claim 1 further comprising at least one LED carried by the fuel inlet conduit and interfacing with the microcontroller.

5. The system of claim 4 further comprising a fuel cap carried by the fuel inlet conduit and wherein the at least one LED is provided on the fuel cap.

6. A fuel overflow alarm system, comprising:
   a fuel tank;
   a fuel inlet conduit provided in fluid communication with the fuel tank;
   at least one fuel splash valve provided in the fuel inlet conduit;
   a pressure-sensing tube provided in fluid communication with the fuel tank;
   a system controller comprising:
      a controller housing;
      a pressure sensor provided in the controller housing and disposed in fluid communication with the pressure-sensing tube; and
      a microcontroller provided in the controller housing and interfacing with the pressure sensor and the at least one fuel splash valve, the microcontroller adapted to automatically terminate dispensing of fuel into the fuel inlet conduit by closing the at least one fuel splash valve responsive to input from the pressure sensor;
   a fuel gauge interfacing with the microcontroller;
   a vent conduit provided in fluid communication with the fuel tank and at least one valve provided in the vent conduit and interfacing with the microcontroller; and
   at least one accelerometer provided in the controller housing and interfacing with the microcontroller, the microcontroller adapted to close the at least one valve provided in the vent conduit responsive to sensing of movement by the at least one accelerometer.

7. The system of claim 6 further comprising a vapor canister provided in the vent conduit and wherein the at least one valve comprises a vent valve provided in fluid communication with the vapor canister.

8. The system of claim 7 wherein the at least one valve comprises a vapor canister valve provided in fluid communication with the vapor canister.

9. The system of claim 6 further comprising at least one LED carried by the fuel inlet conduit and interfacing with the microcontroller.

10. The system of claim 9 further comprising a fuel cap carried by the fuel inlet conduit and wherein the at least one LED is provided on the fuel cap.

11. A fuel overflow alarm system, comprising:
    a fuel tank;
    a pressure-sensing tube provided in fluid communication with the fuel tank;
    a pressure sensor provided in fluid communication with the pressure-sensing tube;
    a system controller having a microcontroller interfacing with the pressure sensor;
    a fuel gauge interfacing with the microcontroller;
    a vent conduit provided in fluid communication with the fuel tank;
    a vapor canister provided in the vent conduit;
    at least one valve provided in the vent conduit in fluid communication with the vapor canister and interfacing with the microcontroller;
    a canister sensor interfacing with the vapor canister and the microcontroller;
    at least one alarm interfacing with the microcontroller; and
    at least one accelerometer interfacing with the microcontroller and the at least one valve, the microcontroller adapted to close the at least one valve responsive to sensing of movement by the at least one accelerometer.

12. The system of claim 11 further comprising a fuel inlet conduit provided in fluid communication with the fuel tank and at least one splash valve carried by the fuel inlet conduit and interfacing with the microcontroller, the microcontroller adapted to automatically terminate dispensing of fuel into the fuel inlet conduit by closing the at least one fuel splash valve responsive to input from the pressure sensor.

13. The system of claim 12 further comprising a fuel cap carried by the fuel inlet conduit and at least one LED provided on the fuel cap and interfacing with the microcontroller.

\* \* \* \* \*